US012748692B2

(12) United States Patent
Dubey

(10) Patent No.: US 12,748,692 B2
(45) Date of Patent: Sep. 29, 2026

(54) ADDRESS TRANSLATION IN A MEMORY SUB-SYSTEM FOR MEMORY POOLING

(71) Applicant: Micron Technology, Inc., Boise, ID (US)

(72) Inventor: Rishabh Dubey, Agrate Brianza (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/781,982

(22) Filed: Jul. 23, 2024

(65) Prior Publication Data

US 2025/0130937 A1 Apr. 24, 2025

Related U.S. Application Data

(60) Provisional application No. 63/591,400, filed on Oct. 18, 2023.

(51) Int. Cl.
*G06F 12/02* (2006.01)
*G06F 12/1072* (2016.01)

(52) U.S. Cl.
CPC ...... *G06F 12/0246* (2013.01); *G06F 12/0284* (2013.01); *G06F 12/0292* (2013.01); *G06F 12/1072* (2013.01)

(58) Field of Classification Search
None
See application file for complete search history.

(56) References Cited

U.S. PATENT DOCUMENTS

| | | | | |
|---|---|---|---|---|
| 8,140,821 B1 * | 3/2012 | Raizen | G06F 11/1448 | 707/637 |
| 2009/0300638 A1 * | 12/2009 | Gustafsson | G06F 9/5077 | 718/104 |
| 2013/0159638 A1 * | 6/2013 | Koinuma | G06F 12/1441 | 711/E12.001 |
| 2016/0266923 A1 * | 9/2016 | Miyoshi | G06F 3/0647 | |
| 2021/0405914 A1 * | 12/2021 | Lam | G06F 3/0655 | |
| 2023/0118846 A1 * | 4/2023 | Ocon Cardenas | G06F 9/5005 | 718/104 |
| 2024/0126469 A1 * | 4/2024 | Lee | G06F 3/067 | |
| 2024/0231615 A1 * | 7/2024 | Choi | G06F 3/0659 | |

* cited by examiner

*Primary Examiner* — Nathan Sadler
(74) *Attorney, Agent, or Firm* — Lowenstein Sandler LLP

(57) ABSTRACT

A system including a memory device and an operatively coupled processing device to perform operations determining a size of a minimum allocation unit (MAU) for a plurality of logical devices, dividing the memory device into logical units with a size equal to the MAU, identifying, using a logical device identifier (LDI) data structure, a first LDI that is available, wherein the first LDI identifies a first logical device, identifying, using a logical unit identifier (LUI) data structure, a first set of LUI that are available, wherein the first set of LUI identify a first set of logical units, allocating the first set of logical units to the first logical device, and updating an LDI-to-LUI mapping data structure to reflect that the first set of logical units are allocated to the first logical device.

20 Claims, 5 Drawing Sheets

FIG. 3A

| LDI-LUI Matrix 301C | LUI 320A | LUI 320B | LUI 320C | LUI 320D | LUI 320E | LUI 320N |
|---|---|---|---|---|---|---|
| LDI 310A | 1 | 0 | 0 | 0 | 0 | 0 |
| LDI 310B | 0 | 0 | 1 | 0 | 0 | 0 |
| LDI 310C | 0 | 0 | 0 | (1) | (1) | 0 |
| LDI 310M | 0 | 0 | 0 | 0 | 0 | 0 |

| LDI Data Structure 302C |
|---|
| 0 |
| 0 |
| (0) |
| 1 |

| LUI Data Structure 303C | | | | | | |
|---|---|---|---|---|---|---|
| | 0 | 1 | 0 | (0) | (0) | 1 |

300C

FIG. 3C

FIG. 3B

| LDI-LUI Matrix 301D | LUI 320A | LUI 320B | LUI 320C | LUI 320D | LUI 320E | LUI 320N |
|---|---|---|---|---|---|---|
| LDI 310A | 1 | 0 | 0 | 0 | 0 | 0 |
| LDI 310B | 0 | 0 | 1 | 0 | 0 | 0 |
| LDI 310C | 0 | 0 | 0 | 1 | 1 | 0 |
| LDI 310M | 0 | (1) | 0 | 0 | 0 | (1) |

| LDI Data Structure 302D |
|---|
| 0 |
| 0 |
| 0 |
| (0) |

| LUI Data Structure 303D | | | | | | |
|---|---|---|---|---|---|---|
| | 0 | (0) | 0 | 0 | 0 | (0) |

300D

FIG. 3D

ADDRESS TRANSLATION IN A MEMORY SUB-SYSTEM FOR MEMORY POOLING

RELATED APPLICATION

This application claims the benefit of U.S. Provisional Application No. 63/591,400, filed Oct. 18, 2023, the entire contents of which are hereby incorporated by reference.

TECHNICAL FIELD

Embodiments of the disclosure relate generally to memory sub-systems, and more specifically, relate to an address translation in a memory sub-system for memory pooling.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 3A-3D illustrate example metadata tables of various logical device and logical unit allocations (represented by “1 s” and “0 s” in each table).

DETAILED DESCRIPTION

Figure 1:
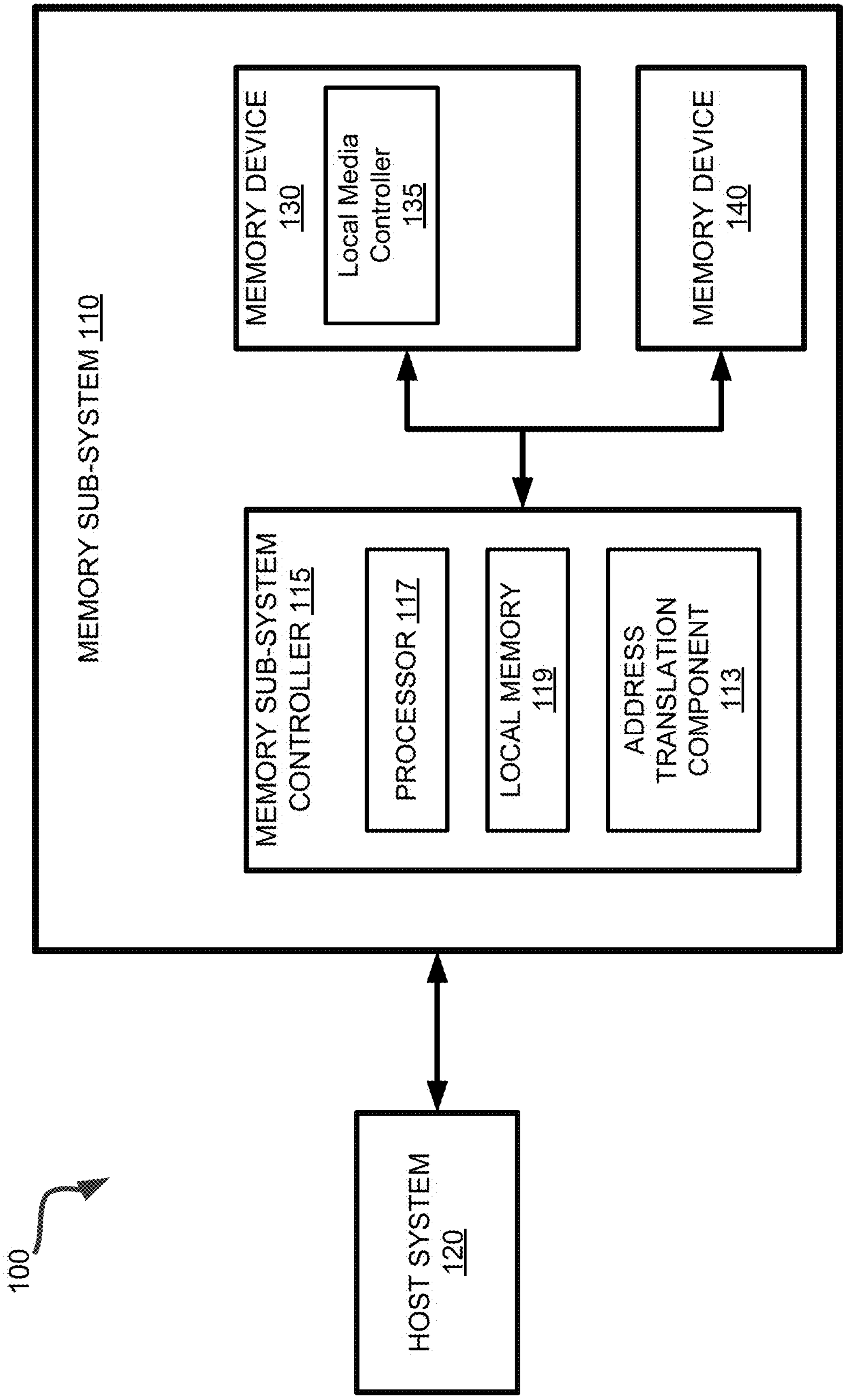
FIG. 1 illustrates an example computing system that includes a memory sub-system in accordance with some embodiments of the present disclosure.
Figure 2A:
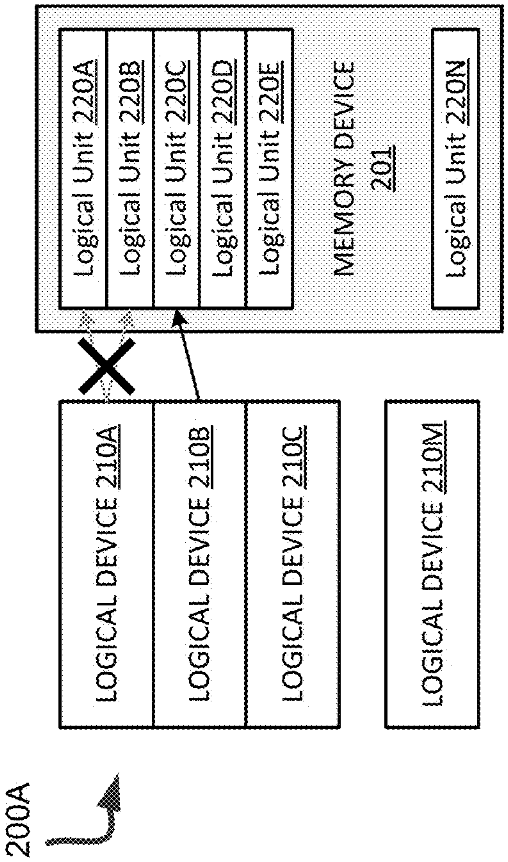
FIGS. 2A-2D illustrate example block diagrams of various logical device and logical unit allocations (represented by arrows), in accordance with some embodiments of the present disclosure.
Figure 2B:
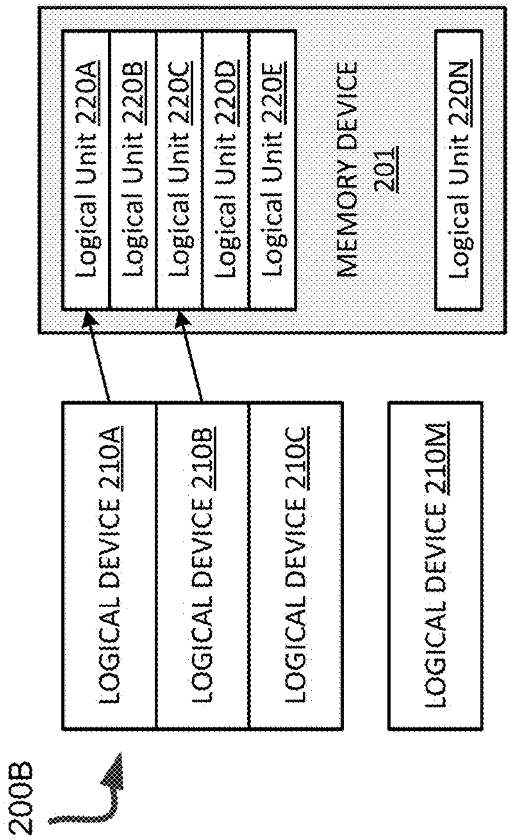
Figure 2C:
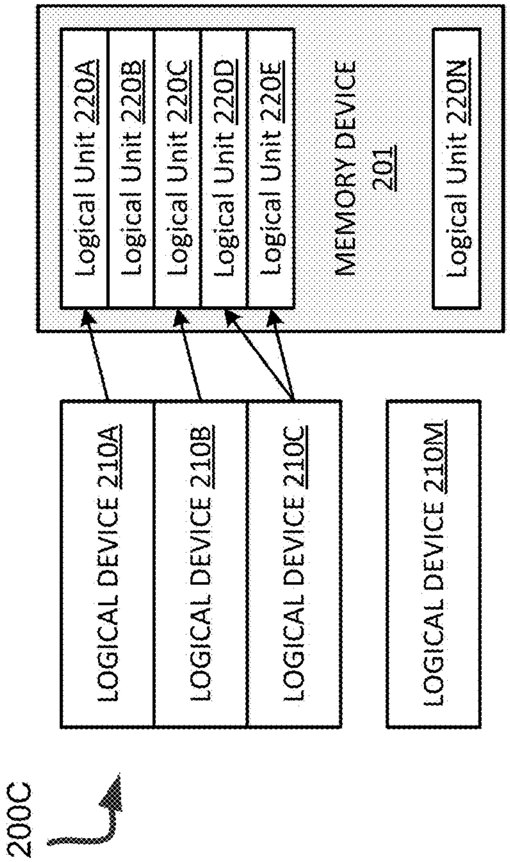
Figure 2D:
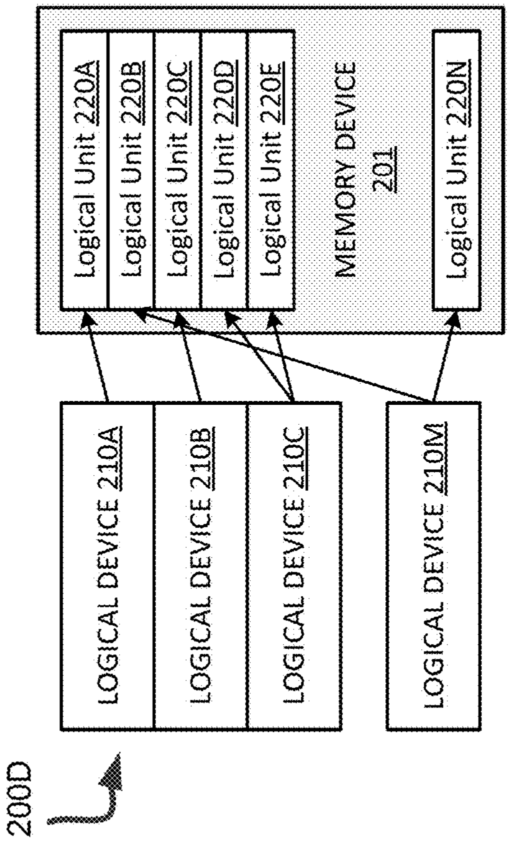

Aspects of the present disclosure are directed to an address translation in a memory sub-system for memory pooling. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, a memory sub-system may be represented by a solid-state drive (SSD), which may include one or more non-volatile memory devices. In some embodiments, the non-volatile memory devices can be provided by not-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. “Block” herein shall refer to a set of contiguous or non-contiguous memory pages. A “block” can refer to a unit of the memory device used to store data and can include a group of memory cells. An example of a “block” is an “erasable block,” which is the minimal erasable unit of memory, while “page” is a minimal writable unit of memory. Each page includes a set of memory cells. A memory cell is an electronic circuit that stores information.

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell can be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Depending on the cell type, each memory cell can store one or more bits of binary information and has various logic states that correlate to the number of bits being stored. The logic states can be represented by binary values, such as “0” and “1,” or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

Precisely controlling the amount of the electric charge stored by the memory cell allows establishing multiple logical levels, thus effectively allowing a single memory cell to store multiple bits of information. A read operation can be performed by comparing the measured threshold voltages (Vt) exhibited by the memory cell to one or more reference voltage levels in order to distinguish between two logical levels for single-level cells (SLCs) and between multiple logical levels for multi-level cells.

Memory access operations (e.g., a programming (write) operation, an erase operation, etc.) can be executed with respect to sets of the memory cells, e.g., in response to receiving memory access commands from the host. A memory access operation can specify the requested memory access operation (e.g., write, erase, read, etc.) and a logical address, which the memory sub-system would translate to a physical address identifying a set of memory cells (e.g., a block).

A memory sub-system can use memory pooling techniques to improve the service provided by the memory sub-system to a host. A “memory pool” can refer to a reserved area of memory that is pre-allocated and managed by the memory sub-system controller, or another system (e.g., a host). A memory pool can be allocated from a memory device, and can have a fixed amount of pre-allocated memory when the memory pool is initialized. In some implementations, a memory pool can be allocated from multiple memory devices. Memory sub-pools can be created from the pre-allocated memory pool as memory resources are requested by system(s) connected to the memory pool. A memory sub-pool can be assigned to a specific memory grouping (e.g., a logical device, etc.). When the logical device needs to allocate memory, the logical device can request a block of memory from the memory pool be assigned to the respective memory sub-pool, rather than requesting a block of memory from the memory device. Memory pooling techniques can optimize memory allocations used by a system (e.g., a memory sub-system or host) by consolidating smaller memory allocations into larger memory allocations in a memory device. This consolidation can potentially reduce the number of separate memory requests made to the memory sub-system, which in turn can reduce the processing overhead of systems that use memory pooling techniques.

Memory pooling techniques can be implemented with software, firmware, hardware, by protocol, and/or their various combinations. In some implementations, Compute Express Link (CXL) protocol can be used to implement a memory pool for a memory sub-system. CXL is a high-speed interconnect standard that can enable different types of processors, such as CPUs, GPUs, etc., to implement memory pooling techniques and share other resources by providing a low-latency, high-bandwidth interface between the processors. CXL can provide a processor with direct coherent access to a memory pool, and can allow the processor to perform memory access operations (e.g., read operations, write operations, etc.) on memory sub-pools that are not assigned to the processor, but are allocated to other processors connected by the CXL standard (e.g., memory sub-pools assigned to logical devices). In this way, connected processors can share data, reduce expensive data copies, reduce wasted memory (e.g., unused, or underutilized memory) and improve allocation of physical memory. When a processor requests a block of memory, the processor can be allocated a block of memory from the memory pool (e.g., a block of memory can be allocated from the memory pool to the memory sub-pool assigned to the processor). The allocated block can be marked as "in use," and the processor can begin using the block. In some implementations, if the memory pool is exhausted, additional memory can be allocated to the memory pool from the memory device. When a processor releases a block of memory to the memory pool from a memory sub-pool, the released block of memory can be marked as "free" and made available for allocation to processors connected to the memory pool. A data structure (e.g., a table) can be maintained for tracking free blocks of memory that are available for allocation. In some implementations, memory blocks of the memory pool can be allocated and released using a page-based allocation scheme. In some implementations, the CXL protocol can reduce the number of separate memory requests made by different processors, which can reduce memory device fragmentation and improve the life and performance of the memory device.

However, the memory pool of the CXL protocol can only indirectly mitigate fragmentation of the memory device, and the memory pool implemented using the CXL protocol is still prone to fragmentation. Although the memory pool is centralized and thus facilitates grouping memory allocations, the memory pool can become fragmented, especially when blocks from the memory pool are frequently allocated/deallocated to the memory sub-pools of connected processors (e.g., logical devices). In some implementations, the memory pool addresses are not statically assigned to physical addresses of the memory device. For example, depending on the allocations of the memory pool, the memory pool address 0x4000 can store data at the physical address 0x4000 of the memory device, or at the physical address 0x8000 of the memory device. In some implementations, the memory pool addresses are statically assigned to physical addresses of the memory device (e.g., certain memory pool addresses are always assigned to certain physical addresses of the memory device). For example, regardless of the allocations of the memory pool, the memory pool address 0x4000 will store data at the physical address 0x4000, and the memory pool address 0x8000 will store data at the physical address 0x8000. In either of the above implementations, the memory pool and/or the memory device can still experience fragmentation at the block level.

In some implementations a memory sub-system controller can move the stored data after the memory is allocated to or released from a processor (e.g., logical device) to mitigate fragmentation of the memory pool and/or memory device. The data can be moved from nonconsecutive portions (e.g., nonconsecutive physical addresses) of the memory device to consecutive portions (e.g., consecutive physical addresses) of the memory device, thus reducing fragmentation of the memory device. However, this strategy may lead to large amounts of memory access operations performed by the controller in the background, which may in turn lead to an increased latency of user-requested memory access operations. In some implementations, the memory sub-system controller can reduce fragmentation in the memory device by using a statically sized memory sub-pool. The size of the statically sized memory sub-pool can be pre-selected during the initialization of the memory pool, and does not change for the life of the memory pool. Logical devices can be assigned to the statically sized memory sub-pools, but are unable to request additional blocks of memory to increase the size of their assigned memory sub-pool. In some implementations, at initialization, the memory pool can be subdivided into a certain quantity of equally sized static memory sub-pools. In a particular implementation for CXL 3.0, the memory pool can be subdivided into 16 equally sized static memory sub-pools, corresponding to the 16 maximum logical device limitation of CXL 3.0. Statically sized memory sub-pools can cause portions of the memory device to be underutilized, e.g., where the amount of memory requested from the memory pool is smaller than the pre-selected chosen static memory allocation size of the memory sub-pool. For example, a memory device can have a statically sized memory allocation of four memory units ("memory units" is used illustratively, and can refer to any size of memory, e.g., a byte, kilobyte, megabyte, gigabyte, etc.). In some implementations, a processor can only be assigned a single statically sized memory sub-pool. In such implementations, if a processor requests a five memory unit allocation but the static size of memory sub-pools is four memory units, the processor can only be assigned a deficiently-sized memory sub-pool of four memory units. In some implementations a processor can be assigned multiple statically sized memory sub-pools. In such implementations, if a processor requests a five memory unit allocation the controller can assign two statically sized memory sub-pools of four memory units each, which can cause three memory units of the memory pool to be underutilized (e.g., eight allocated memory units−five requested memory units=three underutilized memory units).

Aspects of the present disclosure address the above and other deficiencies by providing a memory sub-system implementing an address translation that maps logical devices to configurable logical units. The memory sub-system controller can determine the minimum allocation unit size (MAU) that a logical device can use (e.g., a minimum usable data quantity). Using the MAU as a reference, the controller can divide the memory device into equally sized logical units. When allocating memory to the logical device, the controller can allocate the quantity of logical units needed to meet the memory capacity requested for the logical device. For example, if the MAU for the logical device is one gigabyte, and the memory capacity requested by the logical device is three gigabytes, the controller can allocate three logical units to the logical device. The controller can store, in a logical unit (LU) to logical device (LD) mapping data structure, mapping information that indicates which logical unit(s) are allocated to which logical device(s). The mapping information can be stored in the LU-to-LD mapping data structure using logical device identifiers (LDIs) and logical unit identifiers (LUIs). LDIs can identify respective logical devices, and LUIs can identify respective logical units. LDI-to-LUI maps can be stored as mapping information in the LU-to-LD mapping data structure. When a logical device releases allocated memory, the controller can deallocate the logical unit(s) from the respective logical device. The controller can then update the identifier data structure to indicate that the LDI previously assigned to the logical device is available. The controller can also update the identifier data structure to indicate that logical units deallocated from the logical device are available.

By using the MAU for the logical device as a reference to dynamically adjust the size of allocatable units of memory (e.g., logical units) the controller can reduce fragmentation of the memory device without a significant impact to performance of the memory device. In some embodiments, the controller can prioritize allocating physically neighboring logical units (e.g., consecutive logical units, which have consecutive physical addresses) to the same logical device. If there are not enough consecutive logical units, the controller can allocate consecutive logical units before allocating additional nonconsecutive logical units. For example, a logical device might request sixteen logical units of capacity, and the controller can prioritize allocating sixteen logical units with consecutive physical addresses. However, if the controller does not identify sixteen consecutive logical units in the memory pool (e.g., available LUI that identify logical units in the LU to LD mapping data structure), the controller might allocate six consecutive logical units, another two consecutive logical units, and another eight consecutive logical units, where the physical addresses of each group of logical units are separated by some gap of physical addresses of logical units allocated to other logical device(s). In some embodiments, the controller can allocate sixteen individual (e.g., nonconsecutive) logical units, where the physical addresses of each logical unit are separated by some gap of physical addresses. In these embodiments, fragmentation of the memory device can be improved in comparison to using a more granular page-based block allocation, or a statically sized allocation. Performance of the memory sub-system can be improved in comparison to copying large amounts of data from nonconsecutive physical addresses to consecutive physical addresses during allocation/deallocation of memory to a logical device. Further details regarding the address translation are described below.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, “coupled to” or “coupled with” generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system

120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes an address translation component 113 that can enable the memory sub-system controller 115 to allocate logical units to logical devices. In some embodiments, the memory sub-system controller 115 includes at least a portion of the address translation component 113. In some embodiments, the address translation component 113 is part of the host system 120, an application, or an operating system. In other embodiments, local media controller 135 includes at least a portion of address translation component 113 and is configured to perform the functionality described herein.

The address translation component 113 can determine a minimum allocation unit (MAU) for logical devices associated with memory sub-system 110. In some embodiments, host system 120 can represent a logical device. The address translation component 113 can divide memory device 130 into logical units based on the MAU for the logical devices. The address translation component 113 can include metadata that indicates the logical units that are allocated to respective logical devices. In some embodiments, the metadata can be stored in local memory 119. The metadata can include LDIs which identify respective logical devices, and LUIs which identify respective logical units. The metadata can indicate which LDIs are available. An LDI is available if it is not linked to any LUIs. That is, an LDI is available if there are no logical units allocated to a logical device identified by the LDI. In some embodiments, an LDI is available if it does not identify a particular logical device. The metadata can indicate a maximum quantity of logical devices a memory pool can support (e.g., a maximum quantity of LDIs), and LDIs can be assigned to respective logical devices that request access to the memory pool. After a logical device stops using the memory pool (e.g., logical units have been deallocated from the logical device), the respective LDI can be reused to identify a different logical device. The metadata can also indicate which LUIs are available. LUIs can be permanently assigned to respective logical units when the memory pool and MAU-size are initialized. An LUI is available if the logical unit identified by the LUI is not allocated to any logical device. An LUI that is not linked to any LDIs (as reflected in the metadata) is an available LUI. An LUI that identifies a logical unit in the memory pool (e.g., a logical unit that is not allocated to any logical device) is an available LUI. Thus, an available LUI can indicate the identified logical unit is in the memory pool (e.g., is ready to be allocated) and an unavailable LUI can indicate the identified logical unit is allocated to a logical device (e.g., is not ready to be allocated). Logical units that are in the memory pool are not allocated to any logical device.

The address translation component 113 can allocate logical units to a logical device based on the memory capacity requested for the logical device. In some embodiments, the address translation component 113 can translate a logical address of a given logical device into a physical address of the memory device 130. In some embodiments, the address translation component 113 can cause the memory sub-system controller 115 to perform any or all of the operations described above. In some embodiments, the address translation component 113 can cause the local media controller 135 to perform any or all of the operations described above. In some embodiments, address translation component 113 can be a hardware component outside of memory sub-system controller 115, and can perform any or all of the operations described above using hardware-implementations such as circuit logic.

FIGS. 2A-2D illustrate example block diagrams 200A-200D of various allocations (represented by arrows) of logical units 220A-N to logical devices 210A-M in accordance with some embodiments of the present disclosure. Memory device 201, logical devices 210A-M and logical units 220A-N do not change between block diagrams. Only the allocations of the logical units 220A-N to logical devices 210A-M change between figures. Block diagrams 200A-200D are visual representations of metadata structures described below with reference to FIGS. 3A-3D. Each block diagram 200A-D represents an allocation or deallocation for a single logical device 210A-M.

Memory device 201 is divided into logical units 220A-N. Memory device 201 can be a memory device 130 as described with respect to FIG. 1. Memory device 201 can have an associated physical address space which includes a certain number of physical addresses based on the number of memory cells of the memory device 201. Each logical unit 220A-N can be associated with an equal quantity of physical addresses from the physical address space associated with memory device 201. Consecutive logical units 220A-N (e.g., logical units 220A and 220B are "consecutive") can be associated with a consecutive set of physical addresses (i.e., there is no gap in the physical addresses between each consecutive logical unit 220A-N). Nonconsecutive logical units 220A-N (e.g., logical units 220A and 220C are "non-consecutive) can have a gap between the physical addresses of logical units 220A-N. Nonconsecutive logical units 220A-N can also include partially consecutive logical units 220A-N. For example, the set of logical units 220A, 220B, and 220D are partially consecutive. Physical addresses of logical units 220A are consecutive with physical addresses of 220B, but physical addresses of 22D are not consecutive with physical addresses of 220D, and thus the logical units 220A, 220B, and 220D are partially consecutive.

Logical devices 210A-M can each be allocated a quantity of logical units 220A-N from memory device 201. The quantity ("M") of logical devices associated with a memory sub-system can be set by the memory sub-system controller, such as memory sub-system controller 115. In some embodiments, the quantity of logical devices can be set by a host, such as host system 120. In some embodiments, the quantity of logical devices can be based on a communication protocol or physical interconnect standard. The quantity ("N") of logical units 220A-N within memory device 201 is dependent on the uniform size of each logical unit 220 A-N, and the size of memory device 201. The size of each logical unit 220A-N can be based on a MAU size for logical devices 210A-M. For example, if the smallest file size used by logical devices 210A-M is one gigabyte, the MAU size of the logical devices can be one gigabyte. In this example, the size of each logical unit 220A-N can be one gigabyte, and for a 256 gigabyte size of memory device 201, the quantity of logical units 220A-N would be 256. In many embodiments, the quantity ("M") of logical devices can be different from the quantity ("N") of logical units. When logical units 220A-N are allocated to-, or deallocated from a logical device 210A-M, metadata structures of LDIs and LUIs can be updated to reflect the allocation or deallocation. Metadata structures can include a mapping LDI-LUI data structure, and independent LDI and LUI data structures. Allocations and deallocations can be performed by a controller, such as memory sub-system controller 115 or local media controller 135. Additional details regarding the LDI and LUI metadata structure(s) are described below with reference to FIGS. 3A-3D.

Block diagram 200A illustrates that logical units 220A and 220B are deallocated from logical device 210A by the controller (as illustrated by the black "X" over the grayed-out arrows). Logical unit 220C remains allocated to logical device 210B.

Block diagram 200B illustrates that logical device 210A is allocated one MAU. The controller identifies that logical unit 220A is ready to be allocated (e.g., logical unit 220A is in the memory pool) with a size of one MAU, and allocated logical unit 220A to logical device 210A. Logical unit 220B remains allocated to logical device 210B.

Block diagram 200C illustrates that logical device 210C is allocated two MAUs. The controller identifies a logical unit 220B in the memory pool with an MAU size of one, which does not satisfy the two MAU size requirements. The controller identifies that logical units 220D and 220E are in the memory pool, with a combined MAU size of two that satisfies the two MAU size requirement for logical device 210C. The controller allocated logical units 220D and 220E to logical device 210C. Logical units 220A-N previously allocated to respective logical devices 210A-M remain allocated to their respective logical devices 210A-M. In this illustrative example, the controller does not allocate logical units 220A-N purely sequentially. Logical unit 220B in the memory pool, and could have been assigned with the next logical unit in the memory pool (e.g., logical unit 220D) to meet the two MAU size. However, in the illustrative example of block diagram 200C, the controller is shown to prefer allocating consecutive logical units 220A-N from the memory pool when possible. In some embodiments, the controller can allocate consecutive sets of logical units 220A-N that are in the memory pool. In some embodiments, the controller can allocate logical units 220A-N to a logical device 210A-M sequentially, without regard for consecutive sets of logical units 220A-N. For example, when allocated sequentially, the controller allocates the logical unit 220B in the memory pool is before the logical units 220C-N in the memory pool.

Block diagram 200D illustrates that the logical device 210M is allocated two MAUs. The controller identifies a logical unit 220B is in the memory pool with an MAU size of one, which does not satisfy the two MAU size requirements for logical device 210M. The controller identifies that logical unit 220N is in the memory pool also with an MAU size of one. The controller does not identify consecutive logical units 220A-N in the memory pool that would satisfy the two MAU size. The controller identifies that together, logical units 220B and 220N meet the two MAU size requirement for logical device 210M and allocates logical units 220B and 220N to logical device 210M. Logical units 220A-N remain allocated to respective logical devices 210A-M. In this illustrative example, the controller does not allocate logical units 220A-N purely sequentially. The controller first tries to identify a set of consecutive logical units 220A-N. Upon failing to identify a consecutive set of logical units 220A-N, the controller assigns logical units 220A-N (here logical units 220B and 220N) from the memory pool that can satisfy the two MAU size requirement for logical device 210M. In some embodiments, the controller can identify the first (lowest numbered) logical unit 220A-N from the sequence of logical units 220A-N in the memory pool for each MAU that is required for the logical device. For example, if a logical device 210M requests three MAUs, and logical units 220A, 220C, 220D, and 220E are in the memory pool, the first sequential logical units 220A-N in the memory pool would be logical units 220A, 220C, and 220D. In some embodiments, as illustrated, the controller can identify the first set of consecutive logical units 220A-N in the memory pool from the sequence of logical units 220A-N. For example, if a logical device 210M requests three MAUs, and logical units 220A, 220C, 220D, and 220E are in the memory pool, the first set of consecutive logical units 220A-N in the memory pool would be logical units 220C, 220D, and 220E.

FIGS. 3A-3D illustrate example metadata tables 300A-D of various logical devices 310A-M and logical units 320A-N allocations (represented by "1 s" and "0 s" in each table). Block diagrams 200A-D of FIGS. 2A-2D are visual representations of metadata data tables 300A-D respectively. It should be noted that block diagrams 200A-D are not necessarily products of the address translation, but are used only illustratively as visual representations of metadata tables 300A-D. Metadata tables 300A-D can be stored in local memory of a controller, such as local memory 119 of memory sub-system controller 115 of FIG. 1. Metadata tables 300 can include an LDI-LUI matrix 301, an LDI data structure 302, and a LUI data structures 303. In some embodiments, an LDI data structure 302 and/or an LUI data structure 303 can be derived from an LDI-LUI matrix 301. Using the LDI-LUI matrix 301, if the controller determines any LUI 320A-N is assigned to a given LDI 310, the controller can update the LDI data structure 302 to indicate the given LDI 310 is unavailable. Using the LDI-LUI matrix 301, if the controller determines a given LUI 320 is assigned to any LDI 310A-M, the controller can update the LUI data structure 303 to indicate the given LUI 320 is unavailable.

As described above with reference to FIGS. 2A-2D, logical devices can each be allocated a quantity of logical units from a memory device. When logical units are allocated to-, or deallocated from a logical device, the respective identifying data structure of LDIs 310A-M and LUIs 320A-N can be updated to reflect the allocation or deallocation (e.g., LDI-LUI matrix 301, LDI data structure 302, and/or LUI data structure 303). Each LDI 310 identifies a logical device and each LUI 320 identifies a respective logical unit. For example, LDI 310A can identify a logical device such as logical device 210A as described with respect to FIGS. 2A-2D, and LUI 320A can identify a logical unit such as logical unit 220A. The LDI-LUI matrix 301 can be a table, each row of which corresponds to a certain LDI 310A-M and each column of which corresponds to a certain LUI 320A-N. A value of "1" in an element of the table at the intersection of the i-th row and j-th column can indicate that a certain LDI 310A-M (identified by the index of the row of the table) is assigned a certain LUI 320A-N (identified by the index of the column of the table). Values in the LDI-LUI matrix 301 can be represented by the allocation arrows as illustrated in block diagrams 200A-D. For example, a "1" in the LDI-LUI matrix 301A can indicate the presence of an arrow in a respective block diagram 200A (e.g., that a certain logical unit is allocated to a certain logical device), and a "0" in the LDI-LUI matrix 301A can indicate the absence of an arrow in a respective block diagram 200A (e.g., that a certain logical unit is not allocated to a certain logical device). In the metadata tables 300, parenthesis "(," and ")," can be used around a value (e.g., "(0)" or "(1)") to indicate the value has been updated. Values in the table are updated when logical units are allocated to, or deallocated from logical devices. When a logical unit is allocated to a logical device, the respective LUI 320A-N is assigned to the respective LDI 310A-M by updating the corresponding element in the LDI-LUI matrix 301A-D. Illustratively this is shown in metadata tables 300A-D as a "(1)" in the respective element of the LDI-LUI matrix 301A-D. Similarly, deallocating a logical unit is illustratively shown in metadata tables 300A-D as a "(0)" in the respective element of the LDI-LUI matrix 301A-D. Parenthesis around the value in the table indicate updates to the table from the previous illustrative metadata table 300.

Logical units can be allocated to logical devices using the metadata tables 300. When an allocation is made for a logical device, the controller can traverse the LDI data structure 302 to identify which LDIs 310A-M are available. In the illustrative example, the LDI data structure 302 is a table with a single column, and a quantity of rows equal to the number of LDIs 310A-M. It should be noted that the terms "column" and "row" are used only illustratively, and the LDI data structure 302 can also be a table with a single row and a number of columns equal to the number of LDIs 310A-M. Each row of the LDI data structure 302 corresponds to a certain LDI 310A-M. A value of "1" in an element of the LDI data structure 302 at the i-th row can indicate that a certain LDI 310A-M (identified by the index of the row of the table) is available, and a value of "0" can indicate the certain LDI 310A-M is unavailable. The controller can move sequentially through the table (i.e., row by row, starting at the first row index) until the controller identifies an indication that an LDI 310A-M is available (e.g., the table element of the row corresponding to the LDI 310A-M has a value of "1"). In some embodiments, the controller can select the first sequentially available LDI 310 from the LDI data structure 302. For example, if LDI data structure 302A indicates that LDIs 310A and 310B are available, the controller can select LDI 310A before selecting LDI 310B.

When selecting LUIs to allocate to the available LDI, the controller can traverse the LUI data structure 303 to identify which LUIs 320A-N are available. In the illustrative example, the LUI data structure 303 is a table with a single row, and a quantity if columns equal to the number of LUIs 320A-N. each row of the LUI data structure 303 corresponds to a certain LUI 320A-N. A value of "1" in an element of the LUI data structure 303 at the i-th row can indicate that a certain LUI 320A-N (identified by the index of the column of the table) is available, and a value of "0" can indicate the certain LUI 320A-N is unavailable. The controller can move sequentially through the table (i.e., column by column, starting at the first column index) until the controller identifies an indication that an LUI 320A-N is available (e.g., the table element of the column corresponding to the LUI 310A-N has a value of "1"). In some embodiments, the controller can select the first sequentially available LUI 320A-N from the LUI data structures 303 to allocate to the respective available LDI 310A-N. In some embodiments, the controller can select the first sequentially available set of consecutive LUIs 320A-N from the LUI data structure 303 to allocate to the respective LDI 310A-N.

In FIG. 3A, metadata table 300A reflects that the controller has deallocated LUI 320A and LUI 320B from LDI 310A (as illustrated with the value "(0)"). LUI 320C remains allocated to LDI 310B. To perform the deallocation, the controller traverses the LDI-LUI matrix 301A along the LDI 310A row, checking each LUI 320A-N column for an indication (e.g., "1") that the respective LUI 320A-N is allocated to LDI 310A. If the controller identifies an LUI 320 is allocated to LDI 310A, the controller updates the value of the respective element in the LDI-LUI matrix 301A to indicate that the LUI 320 is no longer allocated to LDI 310A. For example, at the LUI 320A column, the controller identifies a "1" which indicates LUI 320A is allocated to LDI 310A, and updates the "1" to a "0" (illustratively shown as "(0)"). After updating the value at the LUI 320A column, the controller updates the LUI data structure 303A to indicate that LUI 320A is available. The LDI-LUI matrix 301A and LUI data structure 303A can be updated in parallel. In some embodiments, the controller updates the LUI data structure 303A by sequentially traversing through each column. After updating the LDI 320A-LUI 310A element in the LDI-LUI data matrix 301A, the controller continues traversing the LDI 310A row to check the LUI 320B column, and so forth. Upon reaching the last column of the LDI-LUI matrix 301A (e.g., the LUI 320N column), the controller updates the LDI data structure 302A to indicate that LDI 310A is available. In some embodiments, the controller updates the LDI data structure 302A by sequentially traversing through each row.

In FIG. 3B, metadata table 300B reflects that the controller has assigned LUI 320A to LDI 310A, based on a request from a logical device for one MAU. To allocate one MAU to LDI 310A, the controller traverses the LDI data structure 302B to identify an available LDI 310A-M. The controller identifies LDI 310A as available and assigns LDI 310A to identify the requesting logical device. The controller updates the LDI data structure 302B to indicate that LDI 310A is unavailable. The controller allocates logical units to the logical device identified by LDI 310A by determining which LUIs 320A-M identify logical units in the memory pool. The controller traverses the LUI data structure 303B to identify an available LUI 320. After identifying LUI 320A as available with an MAU size of one, which satisfies the one MAU requirement for the logical device identified by LDI 310A, the controller updates the LUI data structure 303B to indicate that LUI 320A is unavailable. The controller updates the LDI 310A row of the LDI-LUI matrix 301B at the LUI 320A column to indicate that LUI 320A has been allocated to LDI 310A. Once the controller has allocated the required number of LUIs 320A-N to the LDI 310A (e.g., the number of MAUs requested by the logical device), the controller stops traversing the LUI data structure 303B. In the illustrative example of metadata table 300B, the required number of LUIs 320 is one, for the one requested MAU.

In FIG. 3C, metadata table 300C reflects that the controller has assigned LUIs 320D and 320E to LDI 310C, based on a request from a logical device for two MAUs. Previously allocated LUIs 320A-N remain allocated to respective LDIs 310A-M. To allocate the two MAUs to LDI 310C, the controller traverses the LDI data structure 302C to identify an available LDI 310A-M. The controller identifies LDI 310C as available, and assigns LDI 310C to identify the requesting logical device. The controller updates the LDI data structure 302C to indicate that LDI 310C is unavailable. The controller allocates logical units to the logical device identified by LDI 310C by determining which LUIs 320A-M identify logical units in the memory pool. The controller traverses the LUI data structure 303C to identify available LUI 320A-N. The controller identifies LUI 320B as available with an MAU size of one, which does not satisfy the two MAU requirement for the logical device identified by LDI 310C. The controller continues traversing the LUI data structure 303C to identify available LUI 320A-N. The controller identifies LUIs 320D and 320E as available with a combined MAU size of two, which satisfies the two MAU requirement for the logical device identified by LDI 310C. The controller updates the LUI data structure 303C to indicate the LUIs 320D and 320E are unavailable. The controller updates the LDI 310C row of the LDI-LUI matrix 301C at the LUI 320D and 320E columns to indicate that LUIs 320D and 320E have been allocated to LDI 310C. Because the controller has allocated the required number of MAUs to the logical device identified by LDI 310C, the controller stops traversing the LDI-LUI matrix 301C and the LUI data structure 303C. In embodiments where the controller attempts to first allocate consecutive sets of LUIs 310A-N, the controller can traverse the LUI data structure 303 multiple times.

In this illustrative example, the controller does not allocate LUIs 320A-N purely sequentially and so even though LUI 320B is available, it is not assigned with the next available LUI 320D (e.g., the controller does not sequentially assign LUIs 320A-N). In the illustrative example, the controller is shown to prefer allocating consecutive LUIs 320A-N when possible. In some embodiments, the controller can allocate consecutive sets of LUIs 320A-N. For example, if the logical device identified by LDI 310A requests four MAUs, and LUI 320A, LUI 320B, LUI 320D, and LUI 320E are available, the controller can assign two sets of consecutive LUIs 320A-N to LDI 310A, i.e., LUIs 320A-320B, and LUIs 320D-320E. In some embodiments, the controller can allocate LUIs 320A-N to a respective LDI 310 sequentially, without regard for consecutive sets of LUIs 320A-N (e.g., an available LUI 320B will always be allocated before an available LUI 320C).

In FIG. 3D, metadata table 300D reflects that the controller has assigned LUIs 320B and 320N to LDI 310M, based on a request from a logical device for two MAUs. Previously allocated LUIs 320A-N remain allocated to respective LDIs 310A-M. To allocate the two MAUs to LDI 310M, the controller traverses the LDI data structure 302D to identify an available LDI 310A-M. The controller identifies LDI 310M as available, and assigns LDI 310M to identify the requesting logical device. The controller updates the LDI data structure 302D to indicate that LDI 310M is unavailable. The controller allocates logical units to the logical device identified by LDI 310M by determining which LUIs 320A-M identify logical units in the memory pool. The controller traverses the LUI data structure 303D to identify available LUI 320A-N. The controller identifies LUI 320B as available with an MAU size of one, which does not satisfy the two MAU requirement for the logical device identified by LDI 310C. The controller continues traversing the LUI data structure 303D to identify available LUI 320A-N. The controller identifies LUI 320N as available with an MAU size of one, which does not satisfy the two MAU requirement for the logical device identified by LDI 310C. Having reached the end of the LUI data structure 303D, the controller determines nonconsecutive LUI 320B and LUI 320E are available, with a combined MAU size of two, which satisfies the two MAU requirement for the logical device identified by LDI 310M. The controller updates the LUI data structure 303D to indicate the LUIs 320B and 320N are unavailable. The controller updates the LDI 310M row of the LDI-LUI matrix 301D at the LUI 320B and LUI 320N columns to indicate that LUIs 320B and 320N have been allocated to LDI 310M. Because the controller has allocated the required number of MAUs to the logical device identified by LDI 310M, the controller stops traversing the LDI-LUI matrix 301D and the LUI data structure 303D.

In this illustrative example, the controller first tries to identify a consecutive set of LUIs 320A-N from LUI data structure 303D. Upon failing to identify an available consecutive set of LUIs 320A-N, the controller still assigns available nonconsecutive LUIs 320A-N to LDI 310M. In some embodiments, the controller can identify the first available (lowest numbered) LUI 320A-N from the LUI data structure 303 to allocate to the LDI 310. For example, if LDI 310M requested three MAUs of memory, and LUI 320A, LUI 320C, LUI 320D, and LUI 320E were available, the first available LUI 320 with an associated three MAU size would be LUI 320A, LUI 320C, and LUI 320D.

In some embodiments, if all logical units have been allocated to respective logical devices (i.e., the LUI data structure 303 and/or the LDI-LUI matrix 301 indicate there are no available LUIs 320A-N), the controller can indicate that the memory pool is exhausted (e.g., that there are no more logical units in the memory pool). In some embodiments, if all logical devices have been allocated some quantity of logical units (i.e., the LDI data structure 302 and/or the LDI-LUI matrix 301 indicate there are no available LDIs 310A-M), the controller can indicate that new logical devices (i.e., logical devices that are not already identified by one of LDIs 310A-M) may not request MAUs from the memory pool. In some embodiments, a memory sub-system may have no available LDIs 310A-M, but multiple available LUIs 320A-N. Similarly, in some embodiments, a memory sub-system may have no available LUIs 320A-N, but multiple available LDIs 310A-M.

Figure 4:
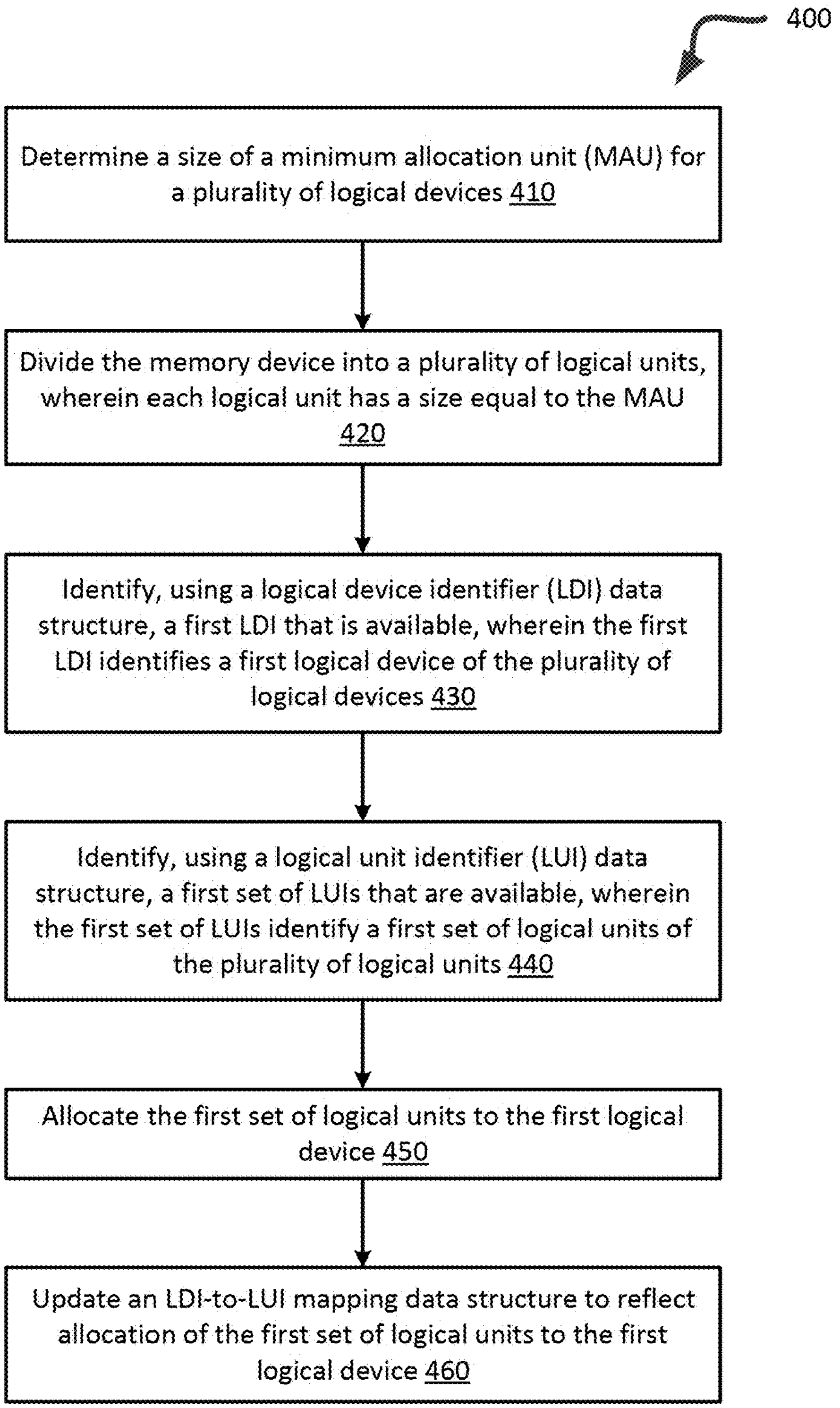
FIG. 4 is a flow diagram of an example method in accordance with some embodiments of the present disclosure.

FIG. 4 is a flow diagram of an example method 400 in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the address translation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the controller implementing the method 400 determines the size of a MAU for a plurality of logical devices. The size of the MAU can be a minimum quantity of data usable by the logical devices. In some embodiments, the size of the MAU can be a minimum file size of the logical devices. For example, a logical device that processes data inputs might load one gigabyte of data at a time to process. For that logical device, the MAU can be one gigabyte. In some embodiments, the MAU size can be configured based on the requirements of the logical devices.

At operation 420, the controller divides the memory device into a plurality of logical units, wherein each logical unit has a size equal to the MAU size. In some embodiments, the controller can receive a request to allocate logical units to a logical device. The request can include a size of the logical device. In some embodiments, the request can include the MAU size. The size of memory allocated to a logical device can be aligned to the MAU size. For example, if the MAU size is four gigabytes, logical device sizes can be multiples of four gigabytes (e.g., four gigabytes, eight gigabytes, twelve gigabytes, etc.).

At operation 430, the controller identifies, using an LDI data structure, a first LDI that is available, wherein the first LDI identifies a first logical device of the plurality of logical devices. The controller can identify an available LDI by traversing the LDI data structure. In some embodiments, the controller can select the first available LDI encountered on the LDI data structure. In some embodiments, the controller can select a random available LDI from the LDI data structure. In some embodiments, the controller can traverse the LDI data structure sequentially, i.e., from a lowest LDI (e.g., LDI-0), to a highest LDI (e.g., LDI-M). In some embodiments, the controller can identify a second LDI that is available. The controller can allocate additional logical units to a second logical device associated with the second LDI, and update the LDI-to-LUI data structure to reflect the additional logical units allocated to the second logical device.

At operation 440, the controller identifies, using an LUI data structure, a first set of LUI that are available, wherein the one or more LUI identifies one or more logical units of the plurality of logical units. In some embodiments, the first set of LUI that are available can include one or more LUI. The controller can identify an available LUI by traversing the LUI data structure. In some embodiments, the controller can select the first available LUI encountered on the LUI data structure as the LUI to be allocated to the first LDI. In some embodiments, the controller can select a random available LUI from the LUI data structure. In some embodiments, the controller can traverse the LUI data structure sequentially, i.e., from a lowest-numbered LUI (e.g., LUI-0, associated with the lowest-numbered physical addresses), to a highest LUI (e.g., LUI-N associated with the highest-numbered physical addresses). In some embodiments, the first set of LUIs can include a subset of consecutive LUIs. In some embodiments, the controller can traverse the LUI data structure to identify the subset of consecutive LUIs (e.g., two or more LUIs with consecutive physical addresses). In embodiments with the controller prioritizing assigning consecutive LUIs, the controller can traverse the LUI data structure multiple times. The controller can allocate one LUI at a time by using a counter to track the controller's traversal position on the LUI data structure. In some embodiments, the controller can traverse the LUI data structure from the start for each LUI allocated to the first LDI (e.g., the controller can stop traversing the LUI data structure without saving the traversal position).

At operation 450, the controller allocates the first set of logical units to the first logical device. In some embodiments, the first set of logical units can include one or more logical units. The first set of logical units can be nonconsecutive. In some embodiments, the logical units are allocated to the first logical device by updating an LDI-to-LUI data structure.

At operation 460, the controller updates an LDI-to-LUI data structure to reflect that the first set of logical units are allocated to the first logical device. In some embodiments, the controller can update the LDI data structure to reflect that the first LDI is unavailable. In some embodiments, the controller can update the LUI data structure to reflect that a respective LUI assigned to the first LDI is unavailable (e.g., each LUI of the first set of LUIs). In some embodiments, once an available LDI is identified, the controller can traverse through the LUI data structure and update the respective LUI entry. Once enough MAUs have been allocated to meet the capacity of the logical device, the controller stops further allocation (e.g., traversing the LUI data structure and updating entries), and updates the respective LDI entry in the LDI data structure. For example, if a logical device with LDI-0 is allocated two MAUs, the controller can traverse the LUI bit map from the beginning, and allocate LUI-3 and LUI-5 to LDI-0 by updating the LDI-0 row at columns LUI-3 and LUI-5 to indicate the respective LUIs are unavailable. In this example, additional LDIs beyond LDI-5 might be available (e.g., LDI-6), but because the controller has allocated the required two MAU size for the logical device, allocation has stopped. The controller can then traverse the LDI bit map until it reaches LDI-0 (i.e., the first entry) and update the LDI data structure to indicate that LDI-0 is unavailable.

The controller can deallocate logical units from the logical device. After deallocating the logical units from the logical device, the controller can update the LDI-to-LUI data structure to reflect that the first set of logical units are not allocated to the first device. In some embodiments, deallocating logical units can be performed by updating the LDI-to-LUI data structure. In some embodiments, while deleting an allocation for a given LDI, the controller can traverse the full row of the given LDI in the LDI-LUI matrix. As the controller moves from column to column, the controller can update the LDI-LUI matrix to indicate that no LUIs are allocated to the given LDI. Each time the controller updates the LDI-LUI matrix to deallocate a LUI from the given LDI, the controller can update the LUI matrix to indicate that the respective LUI is available. Once the controller has iterated to the last column of the given LDI row in the LDI-LUI matrix, the controller can update the LDI data structure to indicate that the given LDI is available. It should be noted that the terms "columns" and "rows" are only used illustratively, and are otherwise interchangeable (e.g., the LDI-LUI matrix can be stored with LDI rows and LUI columns, or with LDI columns and LUI rows, etc.). For example, if a logical device with LDI-0 is allocated LUI-3 and LUI-5, the controller can traverse the LDI-LUI matrix to from LUI-0 to LUI-N for the LDI-0 row, clearing every indication (e.g., update an entry from "1," to "0") that a respective LUI is allocated to LDI-0, (which in this example only applies to LUI-3 and LUI-5). Each time the controller changes an entry to "0," in the LDI-LUI matrix, the controller can update the LUI data structure to indicate that the respective LUI is not allocated to LDI-0. After the controller has traversed the LDI-0 row from LUI-0 to LUI-N, the controller can update the LDI data structure to indicate that the LDI is available.

The memory device can be associated with a physical address space, which can include physical addresses. Each logical unit can be associated with a respective set of consecutive physical addresses of the physical address space. LUIs and logical units identified by the LUIs can be numbered sequentially based on the MAU size and the physical addresses of the memory device. In some embodiments, logical units and LUIs can be numbered from "0," to "N-1", where "N" is the number of logical units based on the memory device size and the MAU size. For example, in a memory device with a size of 256 gigabytes, and a MAU size of one gigabyte (e.g., 0x4000 0000 addresses), LUI numbering can start at LUI-0, and end at LUI-255. In this example, LUI-0 identifies the logical unit associated with physical addresses 0x0000 0000 through 0x3FFF FFFF, LUI-1 identifies the logical unit associated with physical addresses 0x4000 0000 through 0x7FFF FFFF, etc.

Each logical device can be associated with a logical address space, which can include logical addresses. Logical addresses associated with a logical device can map 1:1 to a physical address associated with the one or more logical units. The logical addresses of the logical device can be consecutive, even if the physical addresses associated with the logical units allocated to the logical device are not. For example, the logical addresses of the logical device might be 0x0000-0x7FFF, and the physical addresses associated with the logical units allocated to the logical device might be 0x4000-0xBFFF. In another example, the logical addresses of the logical device might be 0x0000-0x8000, and the physical addresses associated with the logical units allocated to the logical device might be 0x0000-0x4000, and 0x8000-0xBFFF.

The controller can translate the logical addresses of a respective logical device to the physical address of the memory device. In some embodiments, the controller can identify the logical address with respect to a given logical unit based on the MAU size. Using the LDI-to-LUI data structure, the controller can determine the sequential number of the given logical unit allocated to the logical device which contains the logical address. After identifying the LUI for the given logical unit, the controller can use the LUI data structure to determine the physical addresses associated with the given logical unit based on the MAU size. With this information, the controller can apply the appropriate offsets to the logical address to translate the logical address to a physical address of the memory device. For example, a logical device (LDI-0) has three allocated logical units (LUI-0, LUI-1, and LUI-5), each with an MAU of one gigabyte (e.g., 0x4000 0000 addresses). The controller can determine that the logical address 0x8000 0200 of the logical device is associated with the third allocated logical unit (LUI-5) at the address 0x0000 0200 of LUI-5. Using the LDI-to-LUI data structure, the controller can determine the third logical unit of LDI-0 is LUI-5. Then, using the LUI data structure, the controller can determine that the physical address associated with LUI-5 starts at 0x14000 0000. The controller can combine the offset data indicating the address with respect to the start of the logical unit identified by LUI-5 (e.g., 0x0000 0200) and the offset data indicating the physical address associated with the logical unit identified by LUI-5 (0x14000 0000) to determine the physical address is 0x14000 0200. In some embodiments, some or all address translation operations can be performed by hardware components of the memory sub-system.

Figure 5:
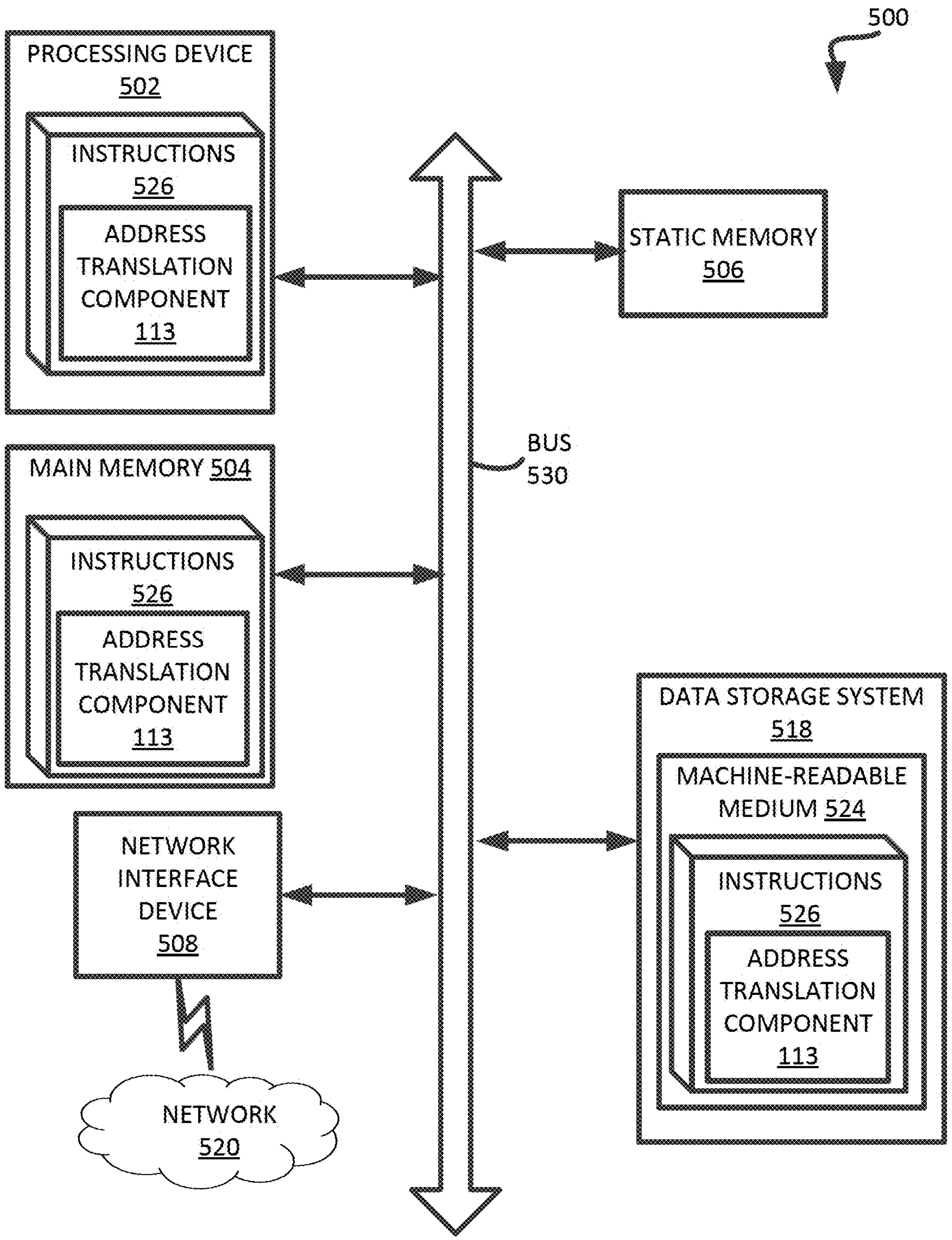
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the address translation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an address translation component 113 (e.g., the address translation component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

determining, for a plurality of logical devices, a minimum allocation unit (MAU) size comprising a minimum quantity of data usable by a logical device of the plurality of logical devices;

dividing the memory device into a plurality of logical units using the MAU size as a reference, wherein each logical unit has a size equal to the MAU size;

identifying, using a logical device identifier (LDI) data structure, a first LDI that is available, wherein the first LDI identifies a first logical device of the plurality of logical devices;

attempting to identify, using a logical unit identifier (LUI) data structure, a first set of LUIs that are available and consecutive, wherein the first set of LUIs identifies a first set of logical units of the plurality of logical units;

responsive to failing to identify the consecutive set of LUIs from the first set of LUIs that are available, assigning available nonconsecutive LUIs to the first set of LUIs;

allocating the first set of logical units to the first logical device; and updating an LDI-to-LUI mapping data structure to reflect allocation of the first set of logical units are allocated to the first logical device.

2. The method of claim 1, wherein updating the LDI-to-LUI mapping data structure further comprises:

updating the LDI data structure to reflect that the first LDI is unavailable; and updating the LUI data structure to reflect that each LUI of the first set of LUIs is unavailable.

3. The method of claim 1, wherein the first set of LUIs comprises a subset of consecutive LUIs.

4. The method of claim 1, wherein each logical unit of the plurality of logical units is associated with a respective set of consecutive physical addresses of a plurality of physical addresses comprised by a physical address space associated with the memory device.

5. The method of claim 4, wherein a first logical address space associated with the first logical device maps to physical addresses associated with the first set of logical units.

6. The method of claim 5, comprising:

translating, using the LDI-to-LUI mapping data structure, a first logical address of the first logical device to a first physical address of the plurality of physical addresses of the memory device.

7. The method of claim 1, comprising:

deallocating the first set of logical units from the first logical device; and updating the LDI-to-LUI mapping data structure to reflect that the first set of logical units are not allocated to the first logical device.

8. The method of claim 1, comprising:

identifying, using the LDI data structure, a second LDI that is available, wherein the second LDI identifies a second logical device of the plurality of logical devices;

identifying, using the LUI data structure, a second set of LUIs that are available, wherein the second set of LUIs identify a second set of logical units of the plurality of logical units;

allocating the second set of logical units to the second logical device; and updating the LDI-to-LUI mapping data structure to reflect allocation of the second set of logical units to the second logical device.

9. The method of claim 1, comprising:

receiving a request to allocate logical units of the plurality of logical units to a logical device of the plurality of logical devices.

10. A computer-readable non-transitory storage medium comprising executable instructions that, when executed by a controller managing a memory device comprising a plurality of memory cells, cause the controller to:

determine, for a plurality of logical devices, a size of a minimum allocation unit (MAU) comprising a minimum quantity of data usable by a logical device of the plurality of logical devices;

divide the memory device into a plurality of logical units using the MAU size as a reference, wherein each logical unit has a size equal to the MAU;

identify, using a logical device identifier (LDI) data structure, a first LDI that is available, wherein the first LDI identifies a first logical device of the plurality of logical devices;

attempt to identify, using a logical unit identifier (LUI) data structure, a first set of LUIs that are available and consecutive, wherein the first set of LUIs identifies a first set of logical units of the plurality of logical units;

responsive to failing to identify the consecutive set of LUIs from the first set of LUIs that are available, assign available nonconsecutive LUIs to the first set of LUIs;

allocate the first set of logical units to the first logical device; and update an LDI-to-LUI mapping data structure to reflect that the first set of logical units are allocated to the first logical device.

11. The computer-readable non-transitory storage medium of claim 10, wherein each logical unit of the plurality of logical units is associated with a respective set of consecutive physical addresses of a plurality of physical addresses comprised by a physical address space associated with the memory device.

12. A system comprising:

a memory device; and a processing device, operatively coupled with the memory device, to perform operations comprising:

determining, for a plurality of logical devices, a minimum allocation unit (MAU) size corresponding to a minimum quantity of data usable by a logical device of the plurality of logical devices;

dividing the memory device into a plurality of logical units using the MAU size as a reference, wherein each logical unit has a size equal to the MAU size;

identifying, using a logical device identifier (LDI) data structure, a first LDI that is available, wherein the first LDI identifies a first logical device of the plurality of logical devices;

attempting to identify, using a logical unit identifier (LUI) data structure, a first set of LUIs that are available and consecutive, wherein the first set of LUIs identifies a first set of logical units of the plurality of logical units;

responsive to failing to identify the consecutive set of LUIs from the first set of LUIs that are available, assigning available nonconsecutive LUIs to the first set of LUIs;

allocating the first set of logical units to the first logical device; and updating an LDI-to-LUI mapping data structure to reflect allocation of the first set of logical units to the first logical device.

13. The system of claim 1, wherein updating the LDI-to-LUI mapping data structure further comprises:

updating the LDI data structure to reflect that the first LDI is unavailable; and updating the LUI data structure to reflect that each LUI of the first set of LUIs is unavailable.

14. The system of claim 1, wherein the first set of LUIs comprises a subset of consecutive LUIs.

15. The system of claim 12, wherein each logical unit of the plurality of logical units is associated with a respective set of consecutive physical addresses of a plurality of physical addresses comprised by a physical address space associated with the memory device.

16. The system of claim 15, wherein a first logical address space associated with the first logical device maps to physical addresses associated with the first set of logical units.

17. The system of claim 16, the operations further comprising:

translating, using the LDI-to-LUI mapping data structure, a first logical address of the first logical device to a first physical address of the plurality of physical addresses of the memory device.

18. The system of claim 12, the operations further comprising:

deallocating the first set of logical units from the first logical device; and updating the LDI-to-LUI mapping data structure to reflect that the first set of logical units are not allocated to the first logical device.

19. The system of claim 1, the operations further comprising:

identifying, using the LDI data structure, a second LDI that is available, wherein the second LDI identifies a second logical device of the plurality of logical devices;

identifying, using the LUI data structure, a second set of LUIs that are available, wherein the second set of LUIs identify a second set of logical units of the plurality of logical units;

allocating the second set of logical units to the second logical device; and updating the LDI-to-LUI mapping data structure to reflect allocation of the second set of logical units to the second logical device.

20. The system of claim 12, the operations further comprising:

receiving a request to allocate logical units of the plurality of logical units to a logical device of the plurality of logical devices.

* * * * *